N. G. ARABIAN.
INSECT TRAP.
APPLICATION FILED OCT. 19, 1915.
1,277,354.
Patented Sept. 3, 1918.
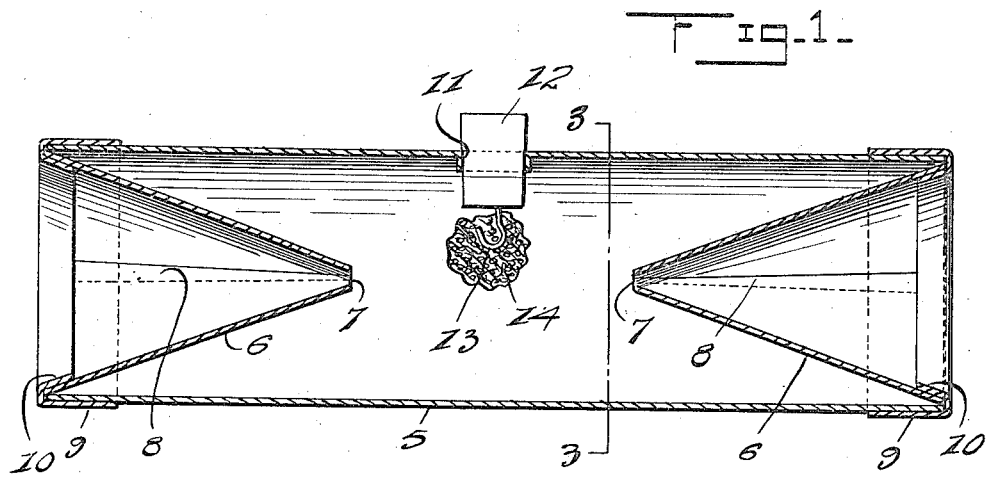
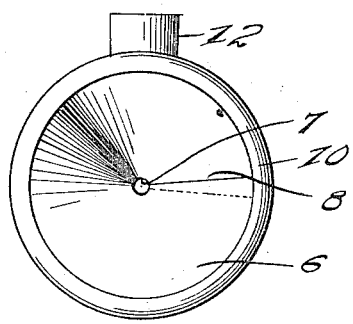 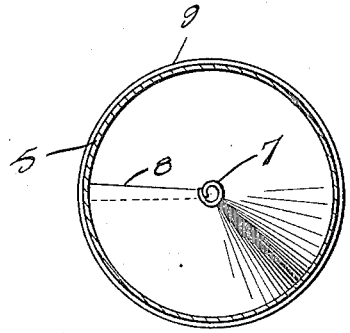
Inventor
N. G. Arabian.

UNITED STATES PATENT OFFICE.

NISHAN G. ARABIAN, OF LAWRENCE, MASSACHUSETTS.

INSECT-TRAP.

1,277,354.　　　　　Specification of Letters Patent.　　Patented Sept. 3, 1918.

Application filed October 19, 1915.   Serial No. 56,764.

*To all whom it may concern:*

Be it known that I, NISHAN G. ARABIAN, a subject of the Sultan of Turkey, residing at Lawrence, in the county of Essex and State of Massachusetts, have invented cernew and useful Improvements in Insect-Traps; and I do hereby declare the following to be a full, clear, and exact description of the invention, such as will enable others skilled in the art to which it appertains to make and use the same.

This invention relates to traps, and has for its primary object to provide an exceptionally simple, inexpensive and efficient trap especially designed for trapping roaches, water bugs and similar insects.

With this and other objects in view, the invention consists in the novel construction, arrangement and formation of parts as will be hereinafter specifically described, claimed and illustrated in the accompanying drawing, in which:

Figure 1 represents a longitudinal sectional view through the improved trap,

Fig. 2 represents an end elevation thereof, and Fig. 3 represents a transverse sectional view on the line 3—3 of Fig. 1.

Referring to the drawing in detail, wherein similar reference numerals designate corresponding parts throughout the several views, the numeral 5 indicates the cylindrical body of the trap having open ends receiving frusto-conical members, which latter project a distance into the body 5 and are formed at their inner extremities with entrance openings 7 spaced centrally within the body 5. The frusto-conical members 6 are split from end to end and the free longitudinal edges 8 thereof are overlapped, as clearly illustrated in Fig. 3. A pair of rings 9 are frictionally engaged over the opposite ends of the cylindrical body 5 and are formed with inwardly directed and inclined flanges 10 adapted to frictionally engage the inner surfaces of the relatively large ends of the frusto-conical members to expand and lock the latter in operative position in the opposite ends of the body 5.

The body 5 is formed with an aperture 11 at approximately its longitudinal center receiving a tapered plug 12 having a hook 13 at its inner end, which latter detachably supports a sponge 14 or wad of other absorbent material.

What I claim is:

A trap including a cylindrical metal body having both ends open, a pair of longitudinally split frusto-conical members having overlapped edges removably engaged to the opposite open ends of said body, a pair of rings frictionally engaged with the opposite open ends of said hollow body, inwardly directed and inclined flanges carried by said rings and adapted to engage the inner surfaces of the relatively large portions of the frusto-conical members to expand the said members outwardly against the inner surfaces of said body to effectively retain the members against accidental displacement from their position in the opposite ends of said body, said body having a flared aperture in the upper portion thereof centrally of the ends of the frusto conical members, a tapered plug removably positioned in the said opening, a sponge holder carried by said plug, and a sponge carried by the holder and arranged in a line with the adjacent open ends of the frusto-conical members.

In testimony whereof I affix my signature in presence of two witnesses.

NISHAN G. ARABIAN.

Witnesses:
　CORNELIUS J. MAHONEY,
　SARAH E. LOFTUS.

Copies of this patent may be obtained for five cents each, by addressing the "Commissioner of Patents, Washington, D. C."